Figure 1:
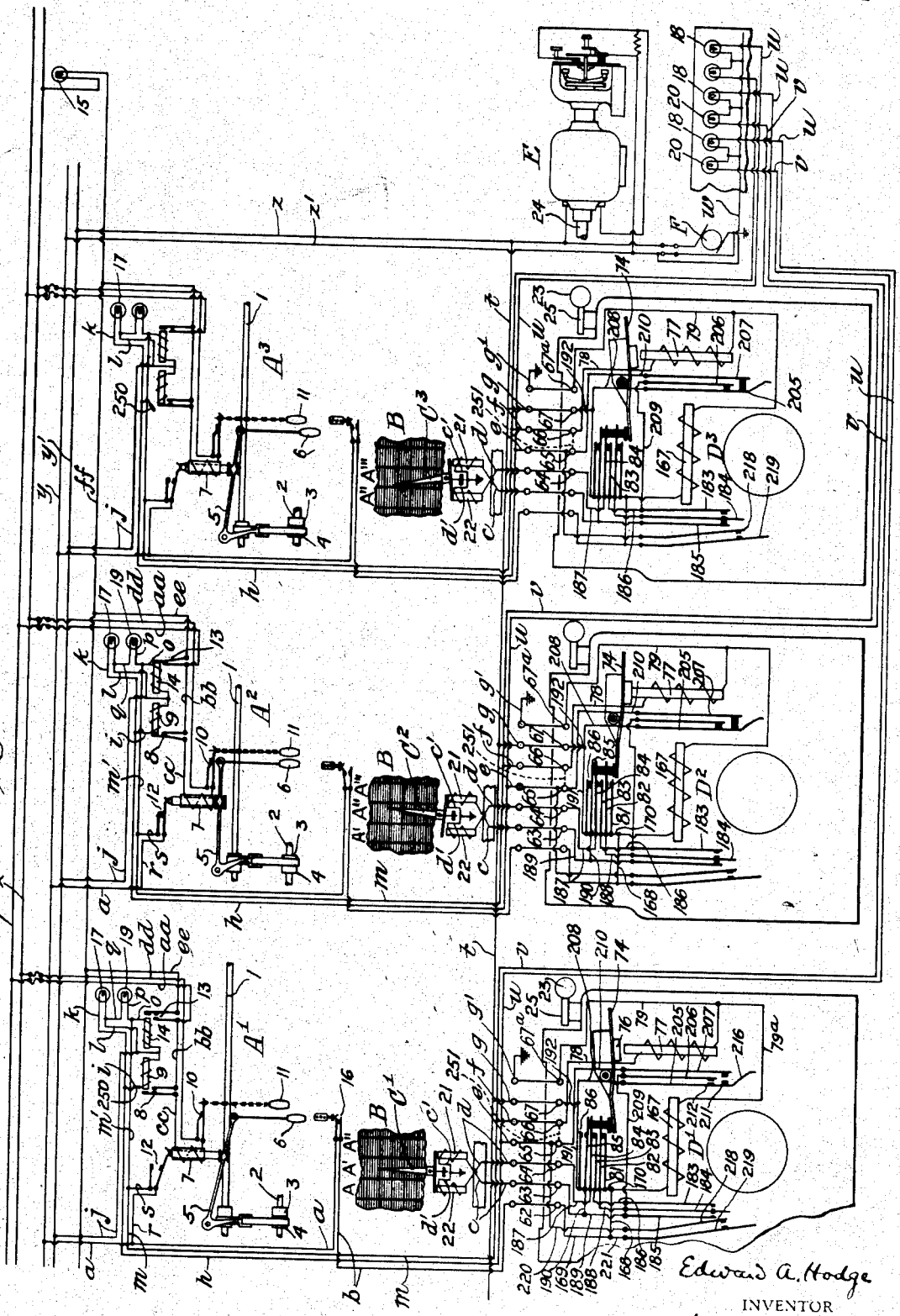
Figure 6:
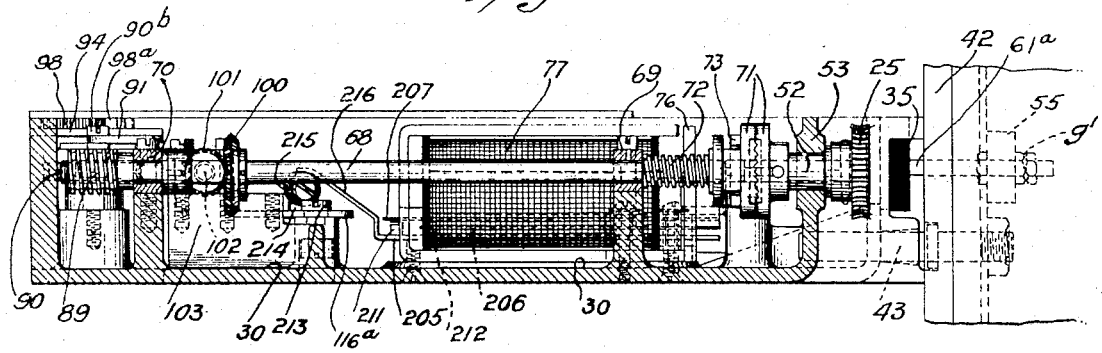
Figure 7:
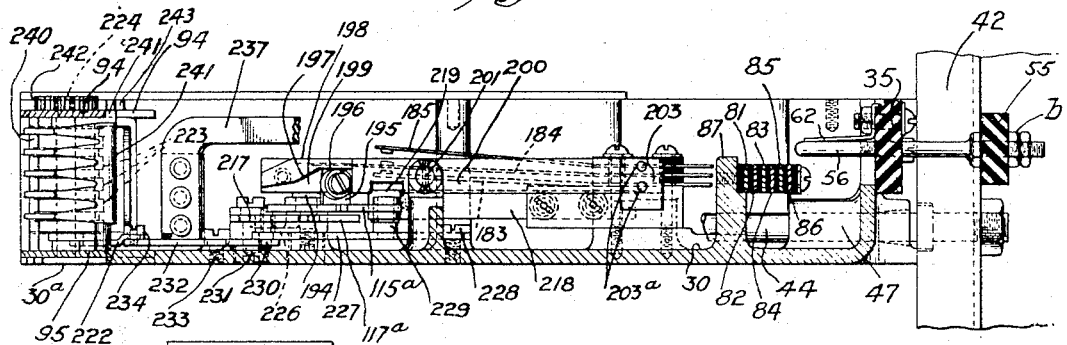

Oct. 11, 1932.  E. A. HODGE  1,881,580
APPARATUS FOR MEASURING PRODUCTION
Filed Dec. 1, 1928   5 Sheets-Sheet 1

Edward A. Hodge
INVENTOR
BY W. B. Whitney
ATTORNEY

Oct. 11, 1932.  E. A. HODGE  1,881,580
APPARATUS FOR MEASURING PRODUCTION
Filed Dec. 1, 1928  5 Sheets-Sheet 2

Fig. 2.

Edward A. Hodge
INVENTOR
BY Wm B. Whitney
ATTORNEY

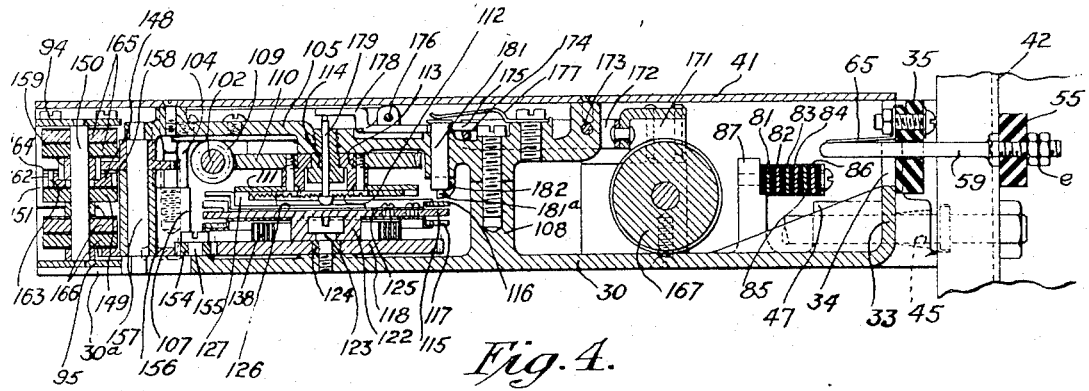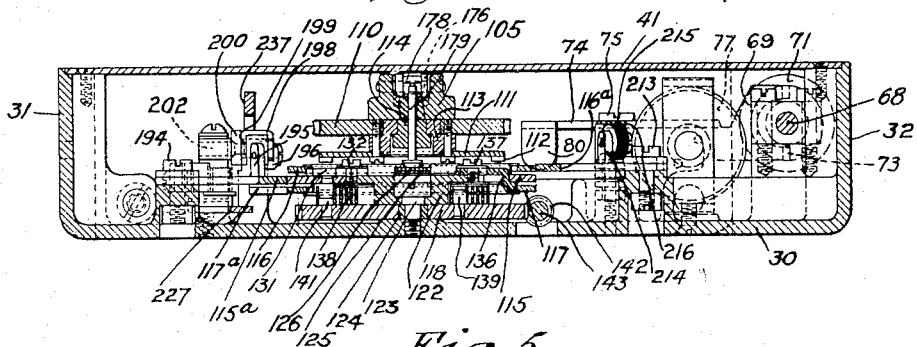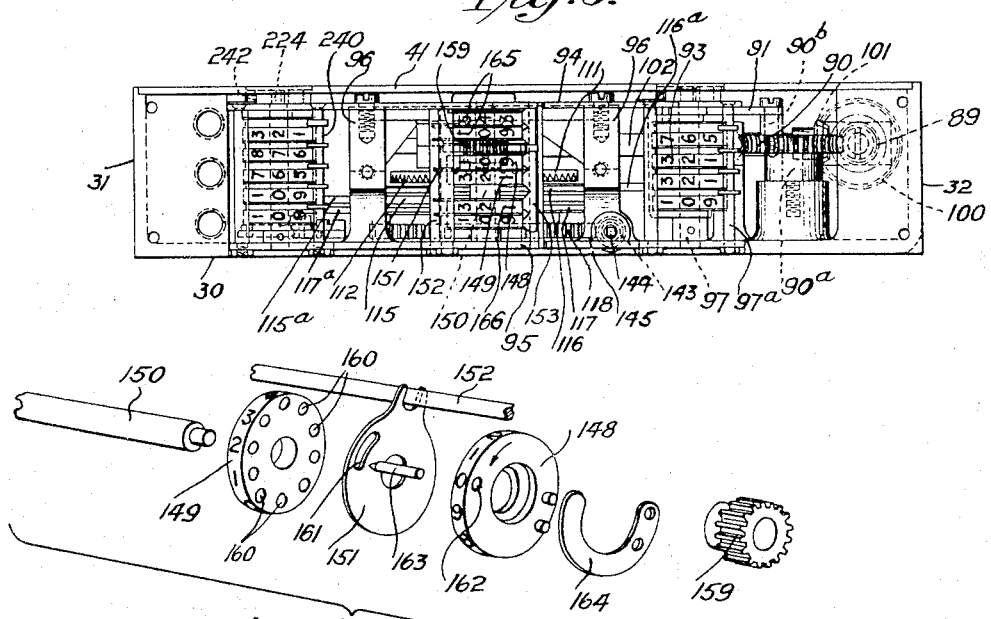

Oct. 11, 1932.   E. A. HODGE   1,881,580
APPARATUS FOR MEASURING PRODUCTION
Filed Dec. 1, 1928   5 Sheets-Sheet 4

Edward A. Hodge
INVENTOR
BY Wm. B. Whitney
ATTORNEY

Oct. 11, 1932.  E. A. HODGE  1,881,580
APPARATUS FOR MEASURING PRODUCTION
Filed Dec. 1, 1928  5 Sheets-Sheet 5

Edward A. Hodge
INVENTOR
BY W. B. Whitney
ATTORNEY

Patented Oct. 11, 1932

1,881,580

UNITED STATES PATENT OFFICE

EDWARD A. HODGE, OF RYE, NEW YORK, ASSIGNOR TO ELECTRECORDER CORPORATION, OF DOVER, DELAWARE, A CORPORATION OF DELAWARE

APPARATUS FOR MEASURING PRODUCTION

Application filed December 1, 1928. Serial No. 323,087.

This invention relates to apparatus, for measuring the productive operation of one or more shop machines, of the type shown and described in Letters Patent No. 1,687,281, of October 9, 1928; and the object thereof is to extend the scope, increase the accuracy, and otherwise improve the efficiency and reliability of such apparatus.

In apparatus of this type there are combined, within a suitable case, a continuously moving chart, a plurality of shiftably mounted markers or styluses bearing against the chart—a marker or stylus for each of a group of shop machines whose performance is to be measured—, a similar plurality of time-indicating disks normally driven at a substantially constant speed, and means controllable by each shop machine for simultaneously so controlling the position of the stylus and the actuation of the time-indicating disks associated therewith that the line made on the chart by the stylus will provide a record both of the efficient productive operation and of the non-efficient productive operation and idle time of the shop machine and the time disks will accumulate and register the time of its efficient productive operation only. The apparatus also usually has associated therewith numbering devices adapted under control of the respective shop machines, to count and register the number of productive operations of each.

More particularly, as set forth in said Letters Patent, the record chart is driven at slow and substantially constant speed from a high speed motor-driven shaft; the recording styluses are shifted on the chart, transversely of the direction of its movement, in one direction by a spring and in the opposite direction by an electromagnet; and self contained registering and control units, removably mounted in staggered position on opposite sides of the drive-shaft and suitably connected with the necessary electric circuits, comprise each a set of time-indicating disks actuated from the drive-shaft through a disengageable connection of a worm gear with a worm on the shaft, and control means including an element detachably coupled to a member driven from the shaft to travel therewith from an adustable starting point through a given path to a second fixed point and there to disconnect the worm gear from the worm to thereby arrest the actuation of the time-indicating disks and stop its own movement and means, electromagnetically controlled by the actuation of a switch upon the commencement of a productive operation by the shop machine, for disconnecting such element from its driving member and returning it to its starting point and there restoring its connection with said member. Thus, allowing a predetermined period of time for the performance by a given shop machine of a productive operation (or group of operations) and for the feeding of the machine to start a new operation, by suitably adjusting the starting point of the control element the said element will be repeatedly released and returned to such starting point before reaching the end of its path of travel, and consequently the time-indicating disks will be continuously actuated and the shop machine will be recorded on the chart as continuously productive, so long as its productive operations are successively completed and new operations begun within the time allowed therefor, and the actuation of the time-indicating disks will be arrested and the stylus will be shifted to record the shop machine as non-productive whenever, and for the period by which, the time actually taken for an operation exceeds the time limit.

One feature of the present invention consists in providing means, controllable by the control means, for shifting the recording stylus to and holding it in three different positions, a central or intermediate position to record production by the shop machine at the predetermined standard speed, and to one or the other of the opposite sides thereof to thereby respectively record production at higher than standard speed or either production at lower then standard speed or, by the length of the vertical line made in this position, a complete shutdown of the shop machine.

Another feature consists in providing each registering and control unit with shutdown mechanism whereby the shop machine will be automatically shut down whenever its rate of production either exceeds or falls below, to a given adjustable degree, its predetermined standard rate.

A third feature consists in equipping each register and control unit with numbering disks which, under the control therein provided, will be actuated, and can only be actuated, by productive operations of the shop machine, to thereby accurately count and register the number of such operations.

The invention also embraces the further novel features hereinafter described and particularly pointed out in the appended claims.

One practical embodiment combining all these various features in what is now considered to be the best form for the practical application thereof is shown, by way of illustration and not of limitation, in the accompanying drawings, in which—

Figure 11:
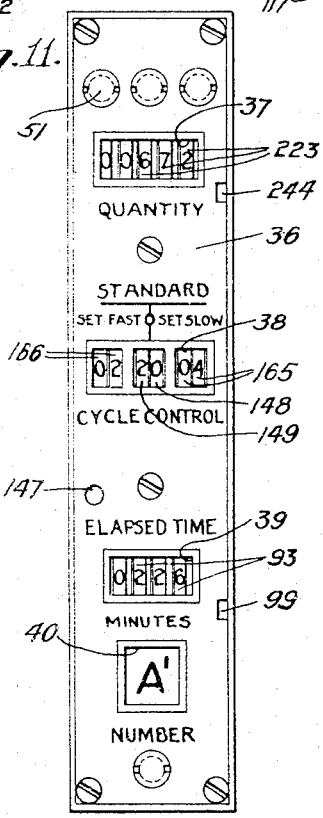
Figure 12:
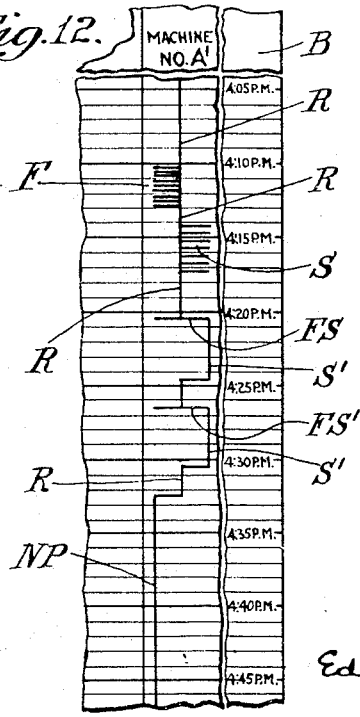
Figure 8:
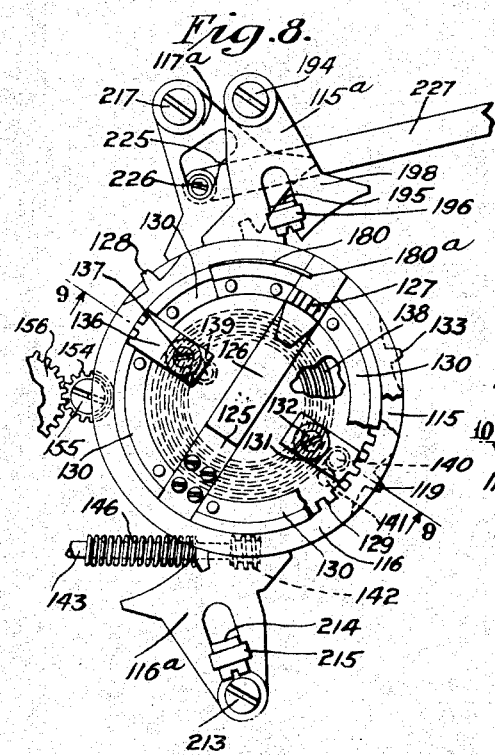
Figure 9:
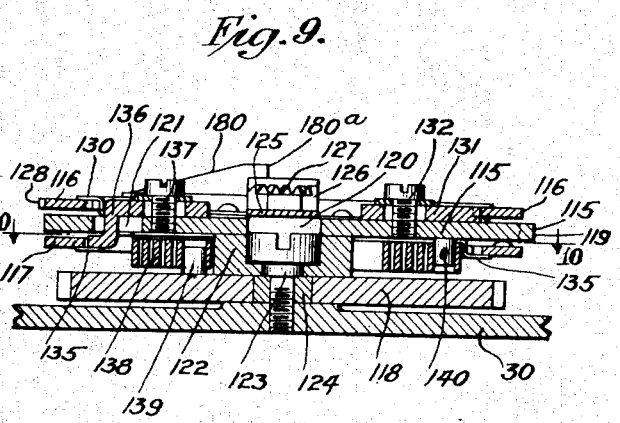
Figure 10:
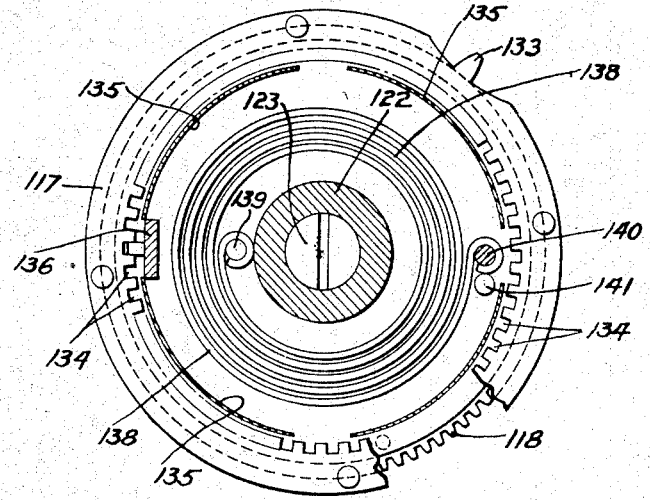

Figure 1 is a diagrammatic view of certain parts of three shop machines and portions of complete apparatus, with their electrical circuits, for registering, recording and controlling the operation of such shop machines, showing three different conditions of the control circuits; Fig. 2 is a view, in side elevation, of one of the registering and control units, with the front side plate removed and certain parts broken away, and also showing, in section, a portion of the bedplate or support upon which these units are mounted; Figs. 3, 4, 5, 6 and 7 are cross-sections upon the lines 3 3, 4 4, 5 5, 6 6, and 7 7, respectively, of Fig. 2, Figs. 3 and 4, however, showing certain of the elements of the mechanism in a different position from that in which they are shown in Fig. 2; Fig. 5$^a$ is an exploded perspective view of the "speed-cycle" registering mechanism; Fig. 8 is an enlarged side elevation, with parts broken away, of portions of the control mechanism in the same position in which they are shown in Fig. 2; Fig. 9 is a further enlarged section on the line 9 9 of Fig. 8; Fig. 10 is a view, partly in side elevation and partly in section, on the line 10 10 of Fig. 9; Fig. 11 is a view, in elevation, of the front or face plate of the registering and control unit; and Fig. 12 is a plan view of a broken section of the record sheet or chart, showing thereon an illustrative record of the operation of a shop machine.

Referring to the drawings, Fig. 1, $A^1$ $A^2$ $A^3$ indicate generally three of a plurality of shop machines—for example, machines for grinding and honing the blades of safety razors—, each of which shop machines, as here illustrated, is driven by a shaft 1 which in turn is driven from a counter shaft 2 by means of a belt shiftable from an idle pulley 3 to a fixed pulley 4 on the said counter shaft. The belt shifter 5 is actuated in one direction, to shift the belt to the fixed pulley, by a handle 6 and in the opposite direction, to shift the belt to the loose pulley and so stop the shop machine, either by means of the handle 6 or, automatically, by a solenoid 7 the actuating coil of which is connected with the positive line wire $x$ of a suitable source of current supply, a 110 volt alternating current for instance, by wire $cc$, contacts 8 controlled by relay magnet 9, and wires $bb$ and $aa$, and with the negative line wire $x'$ by contacts 10, which are normally closed and can be opened by the handle 11, and wire $dd$. The solenoid 7 further serves whenever actuated to close the normally open contacts of switch 12. The line wire $x$ is also connected back from wire $bb$ to the line wire $x'$ over contacts 13, controlled by relay magnet 14, and wires $ee$ and $ff$ through the single signal lamp 15 common to all the shop machines and located at any convenient place in the shop. A suitable switch 16—for example, the switch shown and described in Letters Patent No. 1,672,030, of June 5, 1928, the normally open contacts of which are closed on the discharge from the grinding and honing machine of each finished razor blade—is associated with each shop machine and controls the control circuits of that part of the apparatus which is associated with and measures the productive operation of such shop machine and which in turn controls the actuating circuits of the solenoid 7 and of certain signal lamps 17 18 and 19 20 individual to each shop machine.

The measuring and control apparatus comprises a chart or record sheet three sections of which are indicated at B B B and which as usual is ruled to provide a series of vertical columns, one for each of the shop machines, and narrow horizontal spaces indicating minutes of time, a plurality of recording styluses $C^1$ $C^2$ $C^3$ which are pivotally mounted in front of and bear at their upper ends against the chart, one within each of its vertical columns, a plurality of registering and control units $D^1$ $D^2$ $D^3$, also one for each shop machine, and a speed regulated motor E by which the chart and the mechanism of the several registering and control units are driven.

These parts of the apparatus correspond generally to similarly designated parts of the apparatus shown and described in the said Letters Patent No. 1,687,281 and are, or may be, mounted within such a case as there shown and described and similarly arranged and operated. The chart, which is mounted within the upright portion of the case, is carried upon upper and lower rollers the latter of which is driven through suitable reducing gears from the shaft of the motor as shown and described in the said patent. Here, however, each of the styluses $C^1$ $C^2$ $C^3$ is normally held in position at the center of the vertical column representing the shop machine with which it is associated, by a suitable spring or weight (not shown), to thereby record the shop machine as producing at a predetermined standard rate, and is swung to the right side of the column by the magnet 21 and to the left by the magnet 22 to respectively record the shop machine as not running or producing at lower than the standard rate or as producing at faster than the standard rate. The registering and control units $D^1$ $D^2$ $D^3$ are detachably mounted, within the forward extension of the case, on a suitable support or bed-plate, and, as in the earlier apparatus referred to, the mechanism in each is driven from a continuous extended worm 23 on the motor shaft 24 by a worm gear 25. As here illustrated, however, the worm gears 25 are held permanently in mesh with the worm on the motor shaft, instead of being disengageably geared thereto as previously, and, instead of being arranged in staggered position in two rows on the opposite sides of the motor shaft as heretofore, each additional row of these units, if more than one row, has its worm gears geared to an additional worm shaft 26 (see Fig. 2) which in turn is geared in any suitable manner (not shown) to the motor shaft to rotate therewith and at the same speed.

The letter F indicates generally an electric generator which is actuated by current from the line wires $x$ $x'$ or other suitable source and supplies suitable current, a direct current of 30 volts for example, by feed wires $z$ $z'$ to the motor E and to the line wires $y$ $y'$ of the control circuit system, which system includes, outside of the casings of the registering and control units themselves and for each unit connected in multiple with the line wires $y$ $y'$, the wires $a$, $b$, $c$, $c'$, $d$, $d'$, $e$, $f$, $g$, $g'$, $h$, $i$, $j$, $k$, $l$, $m$, $m'$, $n$, $o$, $p$, $q$, $r$, $s$, $t$, $u$, $v$ and $w$.

The construction and operation of the registering and control units which are all alike and which with their control and controlled lead circuits provide the chief features of novelty of the invention, will now be described in detail.

The casing of such units, shown as substantially rectangular in shape, consists of a casting which provides what may be designated as the back wall or side 30, with certain integral bosses and other projections on its inner side, an integral top, bottom, and rear end walls 31, 32 and 33, which end wall has an elongated opening 34 closed by a plate 35 of insulating material secured by screws to shoulders at the top and bottom of the opening, a forward end or face plate 36, provided with windows 37, 38, 39 and 40 preferably closed at the back with glass or other transparent sheets, which is detachably secured top and bottom by screws to the inturned flanges of the top and bottom walls, and a front wall or cover plate 41 which is detachably secured by screws to the edges of the top, bottom, and rear end walls.

The unit casing is mounted in place, suitably positioned with respect to the extended worm 23, upon the face of a skeleton bed-plate or support 42, preferably inclined and so placed that the face plates of the unit casing will stand just below the glass slant top of the forward extension of the main case, by means of two rods 43 and 44 which are set into the support at the opposite sides of an elongated opening 45 therethrough. The rod 43 fits into a hole extending through the rear end wall of the casing and a boss 46 on its inner surface, while the longer rod 44 extends through a hole in the rear casing wall and boss 47 within the angle of the rear and top walls and into a hole in a second boss 48 on the inner surface of the back wall. The casing is secured to the rod 44 by a screw 49 which is set into the interiorly threaded forward end of the rod within the boss 48 and which may be reached by a long shanked screw driver through holes provided therefor in the inturned flange at the forward end of the top casing wall and in a boss 50 and, when the face plate is in place, through an opening therein upon removal of a screw plug 51 with which such opening is normally closed. When thus secured in position, the worm-gear 25, which is fixed upon the end of a short shaft 52 suitably journaled, between shoulders, in a bearing 53 in the forwardly offset lower end of the rear casing wall and occupies the space provided by such offset, is held in mesh with the worm 23, which in turn is supported, adjacent the worm-gear, within a bearing lug 54 secured to the support. To the back of the support there is also attached, at each side of and extending across the elongated opening 45, a bar 55 of insulating material through which pass conductor plugs 56, 57, 58, 59, 60, 61 and 61ª fixed therein and provided, at the back of the bar, with binding posts by which the outside circuit wires $b$, $c$—$c'$, $d$—$d'$, $e$, $f$, $g$ and $g'$ are respectively connected to the plugs, the wires $c'$, $d'$ and $g'$ serving respectively to ground one end of the coils of the magnets 21 and 22 and the plug 61ª on the case at any suitable point. These conductor plugs, when the casing is in place, project through openings in the insulating plate 35 and at their forward ends respectively make bearing contact with spring contacts 62, 63, 64, 65, 66, 67 and 67ª which are mounted on the forward inner face of the plate 35 by bolts providing at their bases binding posts for the attachment thereto of certain circuit connections within the casing.

A shaft 68 is journaled in bearings 69 and 70, secured upon the ends of bosses on the back of the casing, in axial alignment with shaft 52 and is or may be operatively coupled thereto by a clutch 71 the members of which, one fixed on the inner end of shaft 52 and the other splined upon the adjacent end of shaft 68, are normally held locked together by a helical clutch spring 72 bearing at one end against the hub of the slidable clutch member and at its other end against the bearing 69. The slidable clutch member is moved forward against the action of the spring, to open the clutch and disconnect the two shafts, by the extension 73 of one arm of a lever 74, mounted to rock upon a screw stud 75 set in the end of a boss on the back casing wall, which extension is bent back at a right angle to the plane of the body of the lever and at its forked outer end straddles the hub of the clutch member to bear against a shoulder thereon in the usual manner. The lever 74, preferably of brass or other non-magnetizable metal, carries, attached to the inner end of the extension 73, the soft iron armature 76 of a "stop" magnet 77, which magnet is secured to the back of the casing by screws set into its frame (Figs. 2 and 6) and its actuating coil is connected (as shown only in Fig. 1) at one end by wire 78 to the spring contact 66 and at its other end by wire 79 to the binding post of spring contact 67$^a$, and thence by plug 61$^a$ and wire g' to ground on the outer case. The other arm of this lever carries at its outer end an ear 80, also bent backwardly at a right angle thereto, which controls the contacts of three pairs of spring contact fingers 81 82, 83 84, and 85 86, secured at their upper ends with intermediate insulation to the rear side of a lug 87 on the back of the casing and controlling certain circuits to be hereinafter described, the said ear bearing against the end of a plug 88 of hard rubber or other insulating material set into the extended lower ends of contact fingers 82 and 84 and bearing at its rear end against the extended lower end of contact finger 85. Thus, when the "stop" magnet is energized and draws its armature forward, the lever is rocked and thereby acts, first, to press rearwardly the three extended contact fingers and so open the normally closed contacts of fingers 81 82 and 83 84 and to close the normally open contacts of fingers 85 86, and, immediately thereafter, to press forward the slidable member of and thereby open the clutch; and when the magnet is de-energized and releases its armature the clutch spring closes the clutch and the contact fingers spring forwardly to again open the contacts of fingers 85 86 and close the contacts of fingers 81 82 and 83 84.

The shaft 68 carries fixed to its forward end a worm 89 which is in mesh with a worm-gear 90 mounted upon a screw stud 90$^a$ set into the end of a boss on the back casing wall. In the outer face of this gear there is fixed an eccentric pin 90$^b$, which pin is connected by elbow link 91 to an arm 92 which actuates in the usual or in any suitable manner the unit disk of a standard Veeder four-disk counter 93. The disks of this counter, removed from their usual casing, are mounted, as a matter of convenience, between two plates 94 and 95 which, held spaced apart by shouldered posts and carrying other counting and indicating devices to be later described, are secured in position, immediately behind the face plate 36 with the back plate 95 fitting into and closing an opening 30$^a$ (Figs. 3 and 7) provided therefor in the back casing wall, by screws which attach the front plate 94 to the front outer edges of two lugs 96 96 on the back casing wall and at such outer edges projecting forwardly across the opening 30$^a$ in the wall. The shaft 97 upon which the disks are mounted and rotate is journaled in bearings in the plates 94 95 near the lower ends of these plates so that the disks will register immediately behind and the registration of their peripheral numbers can be read through the window 39 in the face plate; and the detents and disk washers which form constituent parts of such standard counters and operate therein as usual are respectively mounted upon and stopped by a post 97$^a$ set into and extending between the two plates (Fig. 4), and the usual transverse bar 97$^b$ carrying the springs which bear against the backs of the detents is (see Fig. 2) fixed at its ends in the ends of these same plates. The gear connections from the rapidly rotating motor-shaft are here shown as so proportioned that the unit disk of the counter will be actuated once very minute, and hence the unit disk and the other disks actuated therefrom in the usual manner will respectively register the units, tens, hundreds and thousands of minutes of elapsed time during which the motor E is running and the counter is operatively connected therewith by the clutch 71. The disks may be reset to zero, at the end of each day or whenever desired, by means of a gear or peripherally toothed disk 98 which is fixed to the end of the shaft 97 on the outer side of the front plate 94, with a brake spring 98$^a$, fixed to the plate 94, bearing against the ends of the teeth on its upper side. This gear can be rotated, in the proper direction to reset the disks, by the manipulation of a suitable point inserted through an opening 99 provided for the purpose in the face plate.

For driving the control mechanism proper, which in the general principle of its operation and in certain of its details corresponds closely to the similar mechanism of Letters Patent No. 1,687,281, the shaft 68 is also operatively connected, by bevel gears 100 and 101, to an upright shaft 102, extending parallel to the face plate of the casing, which is journaled in bearings 103 and 104 fixed respectively to the end of a boss on the back casing wall and to the back inner side of a skeleton plate or spider 105, which spider in turn is secured by screws—the ends of the lateral arms 106 106 at its forward end upon shoulders 107 107 on the lugs 96 96 and its rearwardly extending body adjacent the end thereof upon a boss 108—in a position approximately paralleling and spaced well apart from the back casing wall.

A worm 109 fixed on shaft 102 meshes with a worm-gear 110 of relatively large diameter which, carrying fixed at its back to rotate therewith a clutch disk 111 with crown ratchet teeth 112 on the back side thereof, is rotatably mounted on the back of the spider 105. In the construction here shown (Figs. 3 and 4), the worm-gear and clutch disk, fitted respectively upon the reduced front and back ends of a hub 113, are secured to each other and to the hub by screws passing through the latter and as a unit are journaled upon a screw stud 114 which with its head countersunk in the back end of the hub is set into the spider, a slight boss on the back thereof providing a bearing surface for the front end of the hub.

Behind the clutch disk 111 and mounted on the back casing wall to rotate coaxially with this disk is an assembly of parts which comprises a main Geneva gear 115 associated with a Geneva quadrant 115ᵃ and carrying spring-mounted ratchet teeth adapted to operatively engage the teeth of the clutch disk, two Geneva gears 116 and 117 mounted respectively on the front and back of the gear 115 concentric thereof and fixed in adjustable angular position to rotate therewith in operative association with Geneva quadrants 116ᵃ and 117ᵃ, and a gear disk 118 operatively connected with the Geneva gear 115 by a volute main spring, all of which are of slightly larger size or greater diameter than the worm-gear and clutch disk 110 and 111.

As best shown in Figs. 8-10, the main Geneva gear 115 with the usual single tooth 119 is cut away to provide an elongated slot 120 extending diametrically thereof at a right angle to the gear tooth and a second opening 121 on the side opposite the gear tooth, and the hub 122 at its back is fixed thereto, by rivets or otherwise, along the sides of the slot 120. It is mounted upon a screw stud 123 which, with head countersunk in the front end and reduced somewhat in diameter to provide a shoulder at the back end of the hub, is set through a spacer sleeve or bushing 124 and into the back wall of the casing, the back end of the hub bearing against the bushing which in turn bears against a low boss on the casing wall. This Geneva gear carries upon its front face, spring-mounted thereon by means of a flat spring hinge 125 removably attached by screws at one end of the slot 120, an arm 126 which extends over the slot and with a forward offset just within the other end of the slot outwardly therefrom to the periphery of the gear; and the arm in turn carries fixed to its free end immediately within the offset therein a block 127 with inclined crown teeth which, as in the prior patent referred to, are in position to engage and are normally held in engagement with the ratchet teeth of the clutch disk 111, thus rotatively coupling the Geneva gear to the clutch disk. The arm is sprung back within the slot, to withdraw its teeth and disengage the two members, by electromagnetic means controlled by the shop machine as in the said prior patent and presently to be described. The extension of the free end of the arm beyond the end of the slot serves as a stop to limit the backward movement thereof.

The Geneva gear 116—the front Geneva gear—, with tooth 128, is in the form of an annular disk which is provided with a series of spaced notches 129 in and extending around its inner periphery. It is mounted and held upon the front face of the main Geneva gear 115, concentric therewith and back of the offset free end of the arm 126, by means of a circular flanged ring provided by four ring segments 130 which are upset to Z-section and riveted or otherwise secured to the gear. The gear 116 is thus capable of being rotated upon the gear 115 to any desired angular relationship therewith; and it is secured in such relationship by an adjusting block 131 which is mounted upon the gear 115, between the adjacent ends of two ring segments, by a clamping screw 132 passing through an elongated slot in the block so that the block can be extended and clamped in place with a tooth at its outer end within one of the notches in the inner edge of gear 116 or withdrawn inwardly far enough to permit this gear to be shifted in its position upon gear 115.

The Geneva gear 117—the back Geneva gear—, with tooth 133 and notches 134 in and around its inner periphery, is identical with the front gear 116 and is similarly mounted upon the back of the main gear 115, by ring segments 135 of Z-section, where it is fixed in the desired angular relationship therewith by an adjusting block 136 which is secured by clamping screw 137 passing through a slightly elongated slot therein, to the front side of gear 115, in the space between the ends of two segments of the flanged ring diametrically opposite the adjusting block 131, and near its outer end is offset backwardly and passes through the opening 121 in gear 115 to engage one of the internal notches 134 in the back gear 117.

The worm-gear 110 is driven from the motor shaft in a counter-clockwise direction; and, as here shown, the gears by which it is operatively connected with the motor shaft are so proportioned that it will make a complete revolution in one minute of time. Hence the three Geneva gears, when operatively coupled to this worm-gear, will rotate, also counter-clockwise at the uniform rate of one revolution per minute, the front and back gears being so adjustably set upon the main gear as to respectively operate slightly behind and slightly in advance thereof. By providing sixty notches in the inner periphery of the front and back Geneva gears, these gears can be set to operate one or more seconds after and before the main gear reaches its operative position. As here illustrated, the front gear is set to operate four seconds behind, and the back gear is set to operate two seconds ahead, of the main gear. The worm-gear 110, and the three Geneva gears, can of course be driven at a slower speed, if found desirable on account of the character of the shop machine with which the apparatus is to be used, by suitably varying the ratios of the gears by which it is operatively connected with the motor shaft.

The gear-disk 118 is mounted to rotate upon the spacer sleeve or bushing 124, and is held in place thereon between the low boss on the back casing wall and the adjacent end of the hub 122 of the main Geneva gear. It is operatively connected with this Geneva gear by a volute main spring 138 the inner end of which, formed into an eye, is fixed upon a post 139 set into the gear-disk while its similarly bent outer end is fixed upon a post 140 set into the Geneva gear near the inner edge of the circular flanged ring carrying the Geneva gear 117. This spring is so arranged that it will be wound up as the Geneva gear is being rotated counter-clockwise through its clutch connection with the worm-gear 110, and, when the Geneva gear is released, will cause it to turn back in a clockwise direction. A second post 141 is set into the gear-disk diametrically opposite the post 139 and in the line of travel of the post 140 on the Geneva gear, and, in connection with said post 140, serves as a stop both to limit the backward clockwise rotation of the Geneva gear under the influence of the main spring and to fix the starting point from which said gear will begin its rotative movement counter-clockwise when clutched in operative engagement with the worm-gear 110.

This gear-disk 118 may be rotated, in either direction, to set the stop post 141 in any desired angular position, and is there held in place, by means of a worm 142 which meshes with the spur teeth of the gear-disk and is carried on the rear end of a short shaft 143 journaled in a bearing bored through the back part or base of one of the two lugs 96. The forward end of shaft 143 (see Fig. 5), terminating behind the face plate 36 in a squared or otherwise suitably shaped head 144, carries a bearing collar 145 which is yieldingly held in engagement with the forward edge of the said lug 96 by a coil spring 146 bearing at one end against the rear edge of the lug and at the other end against a collar on the shaft. The shaft is rotated, to turn the gear disk and set the stop post thereon, by means of a special key which is inserted through an opening 147 provided therefor in the face plate and fits upon the shaped head of the shaft.

The "speed cycle" of the apparatus as determined by the angular position at which the stop post 141 on gear disk 118 is set is automatically registered, in terms of the number of seconds of time (here shown as 20 seconds) taken by the main Geneva gear 115 when driven from the motor-shaft in counter-clockwise direction to travel from its starting point as determined by this post to the point at which its tooth engages the notch in and actuates its associated quadrant, by two Veeder counter-disks which are mounted behind and are read through the central portion of the window 38 in the face plate of the casing. These disks, a unit disk 148 and a tens disk 149 (see Figs. 3, 5 and 5ª), are mounted to rotate upon a post 150 which is set in plates 94 and 95, with an intermediate washer 151 held in the usual manner against rotation by its slotted ear which straddles a post 152 set in these same plates, and are braked as usual by spring-fingers on a resilient metal bar 153 also fixed in plates 94 and 95. The unit disk is rotated from gear disk 118 through a train of gears consisting of a gear 154 mounted on the back casing wall, upon a screw stud 155, to mesh with the teeth of the gear-disk; a second gear 156, meshing with gear 154, which is fixed on the back end of a shaft 157 journaled at its ends in bearings in the back casing wall and in the forward end of the spider 105 respectively; a third gear 158 which is also fixed on the shaft 157 near the forward end thereof; and, meshing with gear 158, a fourth gear 159 which is set partially into the outer front face of the unit counter-disk and is fixed thereto. The usual means for actuating the tens counter-disk from the unit disk not being available in this connection, since in shifting the setting of gear-disk 118 the unit counter-disk may be rotated therefrom at times in one and at other times in the opposite direction, special means (see Fig. 5ª) for the purpose have here been provided. The tens disk 149 has drilled in its inner front face adjacent the washer a series of ten shallow pits or conical cavities 160 which are spaced 36° apart in a circle near the periphery of the disk, the washer 151 has formed therein an elongated arcuate slot 161 which extends, near the periphery of the washer on one side and registering with the pits 160, through an angle of 36° between the centers of its curved ends, and the unit disk 148 has bored therethrough a bearing hole 162, in registry with the slot in the washer and the pits in the tens disk, and carries mounted to reciprocate axially within said bearing a pin 163 the back end of which is tapered to a point at a conical angle of approximately 90° and a substantially semi-circular leaf-spring 164 fixed at one end to the outer front face of the disk and bearing at its free end against the front end of the pin. Thus, when the unit disk is rotated, the pin is carried around with its pointed end pressing lightly against the side of the stationary washer until the slot therein is reached, and then its pointed end is pressed backward through the slot and into a pit in the tens disk and by its engagement therewith carries this disk with it to the end of the slot in the washer, whereupon the end of the slot, acting upon the tapered surface of the pin point, shifts the pin forwardly in its bearing and so withdraws its point from the pit in the tens disk and leaves that disk stationary.

The respective settings of the front and back Geneva gears upon the main Geneva gear are also registered (see Figs. 3 and 5), in terms of the number of seconds of time at which these two gears act with respect to the time of action of the main gear (here shown as 04 seconds behind and 02 seconds ahead respectively), by two pairs 165 and 166 of Veeder unit and tens counter-disks which, with their intermediate washers stopped upon post 152, are mounted to rotate upon the post 150, the pair 165 between gear 159 and plate 94 and the pair 166 between spacing washers at the back of counter-disk 149 and against plate 95, and are read through the lateral openings in the window 38. Spring-fingers on the bar 153 also bear against the peripheries of and brake these disks. These two pairs of registering disks are set by hand, no provision for their automatic operation being necessary since the settings of these two Geneva gears are rarely changed and, as seen, are adjusted manually and at a time when the worm-gear 110 and clutch disk 111 are not in position in front of them.

The means by which the operative engagement of the Geneva gear 115 with the clutch-disk 111, through the spring-mounted arm 126 carried by the former, is controlled will now be described with reference to Figs. 2, 3 and 4 of the drawings. A second or "speed cycle release" magnet 167, vertically positioned adjacent the rear end of the spider 105, is fixed to the back casing wall, as by screws set through this wall and into the pole pieces at each end of the magnet (Figs. 3 and 6), and (as shown only in Fig. 1) one end of its coil is connected by wire 168 both to wire 169 and by the latter to the binding post of the spring-contact 62 and also to wire 170 and thereby to the fixed end of contact finger 81 and its other end, as in the case of magnet 77, is connected by wires 79ª and 79 to the binding post of spring contact 67ª and thence by plug 61ª and wire g' to ground on the outer case. Its armature 171 is pivotally mounted upon the rear end of the spider 105, to rock to and from the pole pieces of the magnet, by a yoke 172, preferably of brass or other non-magnetizable metal, the arms of which, straddling this end of the spider, are pivoted upon a pin 173 set through a transverse boss on the spider and at their forwardly extending ends are connected, across the front outer face of the spider, by a rod 174. This transverse connecting rod 174 extends across and bears against the back of the forked end of the rearwardly extending arm of a lever 175, which lever is mounted to rock upon a pivot pin 176 set through outturned ears thereon and into the sides of a depression provided for the lever in the front outer face of the spider. A spring 177, which is fixed at its rearward end to the face of the spider, bears (through the head of a pin presently to be described) against the front of the lever arm 175, the action of the spring thus opposing that of the magnet through the transverse rod 174. The forwardly extending arm 178 of the said lever bears against the front end of a pin 179, which is mounted to reciprocate back and forth within an axial bore through the screw stud 114 and at its headed back end in turn bears against the face of the spring-mounted arm 126. Hence, whenever the coil of "speed cycle release" magnet 167 is energized and attracts its armature, thereby swinging the transverse rod 174 towards the front, the rear arm of lever 175 is rocked to the front against the action of spring 177, and the forward arm 178, which is thus rocked backwards, forces back the pin 179 and with it the arm 126 to thereby disengage the teeth carried by the latter from the ratchet teeth of clutch disk 111. The three Geneva gears, when thus released from the clutch disk, are at once swung back by the action of the main spring 138 until the spring post on the main Geneva gear 115 reaches and is stopped by the stop post on gear disk 118. Then, on the de-energization of the "speed cycle release" magnet and the release of its armature, the arm 126, aided by the action of spring 177, springs forward and re-establishes the engagement of its teeth with the teeth of clutch disk 111.

As a precautionary measure, to prevent the Geneva gears from being rotated by the clutch disk 111 through more than one revolution in the event of a delay in the action of the "speed cycle release" magnet 167, the main Geneva gear 115 is provided (see Figs. 8 and 9) with a cam 180—the inclined edge of the outward arcuate flange of a light metal segment shaped to fit and attached to the gear upon one of the flanged ring segments 130—which is located immediately ahead of the outer free end of the arm 126 and at its rear high end is extended, at 180ª, over and partially across this offset end of the arm; and, cooperating with said cam, the pin 181 (Figs. 2 and 3), already mentioned, which, with head located between the front face of the lever arm 175 and the back of spring 177 and extending through the fork in the end of the arm, reciprocates axially within a bearing bored therefor through the spider 105 and at its back end has a reduced point extension 181$^a$, one side of the shoulder surrounding this point being located in the path of the cam 180. Accordingly, should the cam, in the counter-clockwise rotation of the Geneva gears, reach this pin it will first engage the shoulder on its end to force the pin forwardly so that its pointed extension will clear the arm 126 and then, on passing therefrom, will release the pin, which will be pressed back by spring 177 and with its pointed extension will in turn press back the arm 126, thereby disengaging the arm from the clutch disk. Moreover, since such backward movement of the pin carries its body into the path of the rear high end 180$^a$ of the cam, the Geneva gears will be held locked in place thereby against the returning action of the main spring 138; and these gears will not be released, to be returned by the main spring to the starting point of their travel with the clutch disk, until the magnet 167 is again energized and by the action of its armature on the lever 175 withdraws the pin from its stop engagement with the rear end of the cam.

As a final safeguard, a screw post 182 (see Figs. 2 and 3) is set in the spider 105 and is positioned therein just outside the path of the cam 180 and in position to act shortly after the pin 181 should act. This post has a conical back end which is so located in the path of the outer free end of the arm 126 that, should the arm ever reach the position to engage therewith, the inclined surface of the cone tip will act as a cam to force the arm backward and out of engagement with the clutch disk. This post, however, will not lock the Geneva gears against a return movement through the action of the main spring. Hence the spring will start to move the Geneva gears back but the arm 126 as soon as freed thereby from the end of the post will spring forward into engagement with the clutch disk, with the result that the Geneva gears will be repeatedly rocked forward and back through a small radial angle insufficient to actuate either the contact finger 219 or the numbering counters 223.

The main Geneva gear 115 and its notched quadrant 115$^a$ serve as "speed-cycle" control means to control (see Figs. 2, 4 and 7) the contacts of three spring contact fingers 183, 184 and 185, which contact fingers at their rear ends are secured in place, with intermediate insulation, upon the end of a lug or boss on the back casing wall, and at such ends are respectively connected (as shown only in Fig. 1) the contact finger 183 by wire 186 to the fixed end of contact-finger 83 and thence by contact finger 84 and wire 187 to the binding post of spring contact 64, the contact finger 184 by wire 188 to the fixed end of contact finger 82, and contact finger 185 by wire 189 to the binding post of spring contact 63 and also by branch wire 190 from wire 189 to the fixed end of contact finger 85 and thence by contact finger 86 and wires 191 and 192 to the binding post of spring contact 67. The middle contact finger 184 is normally held in spring contact with contact finger 183; and it is sprung forward first to neutral position, opening its contact with contact finger 183, and then by a further movement to close contact with contact finger 185, and is released, to spring back to normal position subject to control by the "speed-cycle release" magnet 167 as presently described, by the movement of the Geneva quadrant. To this end the quadrant, mounted to rock upon a screw stud 194 set into the end of a boss on the back casing wall, carries a roller 196 which is mounted upon a screw stud set into an ear 195 cut from the quadrant and bent backward at a right angle to the plane thereof. The said roller cooperatively engages the back inclined cam edge 197 on one flange of a light channel-shaped member 198 which by its other flange 199 is fixed to the lower side of the forwardly projecting arm of a lever 200, which lever in turn is mounted to rock upon a pin 201 fixed thereto and turning within a bearing in the outer end of a suitable boss on the back casing wall and carries fixed on its upper side, opposite the roller 196, a stud 202, of hard rubber or other insulating material, bearing against the back side of the extended free end of contact finger 184. The rearwardly extending arm of this lever, which preferably is of brass or other non-magnetizable metal, carries at its end, loosely secured upon pins 203$^a$, (see Fig. 7) a soft iron armature 203 which as the arm is rocked swings in a plane parallel to and in close proximity to the upper pole piece 204 of magnet 167. In operation, therefore, when the quadrant is rocked forwardly on the counter-clockwise rotation of the gear 115, the roller thereon, bearing against the cam edge, will rock the lever and thereby press the free end of contact finger 184 forward, to break its contact with contact finger 183 and move it to neutral position, and then, unless the Geneva gear is meanwhile released, to move it farther to establish contact with contact finger 185; and, since the energization of magnet 167 simultaneously with its action in effecting the release of the Geneva gear draws to its pole piece and seals thereto the armature 203 on the rear end of the lever, the release of the lever, although freed by the roller as the latter is moved to the lower end of the cam by the return movement of the Geneva gear and quadrant, will be delayed and the contact finger 184 cannot spring back to normal position so long as the magnet remains energized.

The front Geneva gear 116 and notched quadrant 116ª serve as "slow speed" control means to control (see Figs. 2, 4 and 6) the normally open contacts of three spring contact fingers 205, 206 and 207, which contact fingers at their rear ends are secured, with intermediate insulation, side by side upon the end of a lug or boss on the back casing wall and thereat are respectively connected (as shown only in Fig. 1) the contact finger 205 by wire 208 to the wires 191 and 192, the contact finger 206 by wire 209 to the wire 186, and the contact finger 207 by wire 210 to the binding post of spring contact 65. Here, the middle contact finger 206 is somewhat shorter than the other two, and contact finger 205 carries two contact points 211 and 212, the outer contact 211 being located beyond the end of contact finger 206 and of such length that, on contact finger 205 being sprung forwardly, this contact will make contact with contact finger 207 at the same time that the contact 212 makes contact with contact finger 206. To effect such action of contact finger 205, this Geneva quadrant, mounted to rock upon a screw stud 213 set into the end of a boss on the back casing wall, carries a roller 215, of hard rubber or other insulating material, which is mounted on a screw stud set into an ear 214 cut from the quadrant and bent forward at a right angle to the plane thereof; and this roller co-operatively engages a cam surface 216, formed by bending forward at an incline the extended free end of contact finger 205, to press this contact finger forward when the quadrant is rocked ahead by the counter-clockwise rotation of the Geneva gear and to release it, to thereby allow it to spring back to its normal position, when the Geneva gear is released and in returning to its starting position rocks the quadrant backward.

The back Geneva gear 117 and its notched quadrant 117ª, the latter mounted upon a screw stud 217 set into the top of a low boss on the back casing wall, serves (see Figs. 2, 4 and 7) both as "excess speed" control means through a control of the normally closed contacts of a pair of spring contact fingers 218, 219, which contact fingers at their rear ends are secured with intermediate insulation to the upper side of a lug on the back casing wall and thereat are respectively connected (as shown only in Fig. 1) the former by wire 220 to the binding post of spring contact 65 and the latter by wire 221 to the wires 168 and 169, and to effect and control the operation of the actuating arm 222 of a standard set 223 of five Veeder counter-disks which, removed from their usual casing as in the case of the similar time-registering set of disks already described, are mounted to rotate upon a shaft 224 journaled in bearings in the upper ends of the plates 94 and 95, in which position they are located immediately behind and can be read through the upper window 37 in the face plate of the casing. For the performance of this double function, this back quadrant is here cut out to provide an opening, generally of triangular shape, with an inclined edge 225 which serves as a cam; and, co-operatively related to said cam, there is a roller 226 mounted upon a screw stud set into the forward end of a lever 227 which at its rear end is pivoted upon a screw stud 228 set into the end of a low boss on the back of the casing wall, to rock immediately behind the quadrant. This lever carries, intermediate its ends, a forwardly projecting stud 229, of hard rubber or other insulating material, which engages the lower face of the extended free end of contact finger 219 and by which the said finger is pressed upward and out of contact with contact finger 218 whenever the quadrant is rocked forward by the counter-clockwise revolution of the Geneva gear and by the action of its cam swings upward the forward end of the lever. The lever 227 is also operatively connected at its forward end with the rear end of an elbow lever 232, by backward extension 230 of the screw stud upon which roller 226 is mounted within a slightly elongated slot 231 near the end of the elbow lever; and the elbow lever, which is mounted to rock upon a screw stud 233 set into a low boss on the back casing wall, is in turn operatively connected at the end of its forwardly extending arm by a screw stud 234 to the actuating arm 222 of the unit disk of the Veeder counters. To the forward arm of the elbow lever there is also attached one end of a coiled tension spring 235, which at its other end is secured to a post 236 set into the back casing wall, and this arm of the lever further carries a relatively long arm 237, of brass or other non-magnetizable metal, which, offset to clear the Geneva gear mechanism, extends rearwardly and at its free end carries a soft iron armature 238 adapted to swing between a cushioned stud or stop 239 set into the back casing wall and the extended forward end of the upper pole piece 204 of magnet 167. The operation of these parts is such that when the Geneva quadrant is rocked forward and rocks the lever 227, to open the contacts of contact fingers 218 219, the rocking of the elbow lever will cause the actuating arm of the counter-disks to draw the usual pawl back one tooth on the usual ratchet wheel and at the same time put the spring 235 under tension, and it is this spring which, when the levers are released, effects the movement of the actuating arm to turn the unit disk of the counter. It is to be observed that here, as in the case of the lever associated with the main Geneva gear, the levers will not be released by the withdrawal of the cam from the co-operating roller when the quadrant is rocked backward on the release and return of the Geneva gears, but will be delayed by the action of magnet 167 upon the armature 238 until the actuating circuit of the magnet is opened and the magnet is de-energized and releases the armature. This is important since, if the contact fingers 218 and 219 were to close their contacts, while magnet 167 was energized, these would re-establish a circuit which as will be seen would automatically produce a shut-down of the shop machine.

The disks of the counter 223, which serve to register the number of productive operations of the shop machine with which the apparatus is associated, are actuated from the unit disk in the usual manner. Here, also, as in the case of the time registering counter disks, the usual detents and disk washers (Figs. 2, 5 and 7) are respectively mounted upon and held against rotation by a post 240 set into and extending between plates 94 and 95, and the usual transverse bar 241 carrying the springs which bear against the backs of the detents is fixed at its ends to the ends of these same plates; and, similarly, for resetting the disks to zero, a gear or peripherally toothed disk 242 is fixed to the end of the shaft 224 on the outer side of the front plate 94, with a brake spring 243 also fixed to the plate and bearing against the ends in its teeth, which is manipulated by a suitable point inserted through an opening 244 provided for the purpose in the face plate.

It only remains to describe the operation of the complete apparatus.

When, as at night, the shop machines and the generator F are shut down, there is no current in any of the control circuits supplied by the generator. Magnet 77 being de-energized, clutch 71 is closed by its spring; but none of the mechanism of the apparatus is actuated since the motor E is not running. The record sheet is stationary, and the several styluses stand each at the center of a column on the chart since neither of their magnet coils is energized. The mechanism of each of the registering and control units is in the position shown in Figs. 2 and 8–10, the Geneva gears by action of main spring 138 resting at the limit of their backward motion as determined by the position of the stop post 141. And all of the switch contacts in the control system are in their normal condition, open or closed as the case may be, with the single exception of the switches 12 the normally open contacts of which are closed when, on the shutting down of the shop machines, the belts by which they are operated are shifted to the loose pulleys 3 either by pushing up the handles 6 or by the action of the solenoids 7.

At the beginning of a working day, the generator F and motor E will first be started. Thereupon, the motor will set the record chart B in motion and the worm on its shaft will begin to rotate the worm-gears 25 and shafts 52 of the several registering and control units. But, practically simultaneously therewith and for each shop machine, a control circuit will be established from line wire $y$ of the control system, now charged with current, by wires $a\ r\ s$, contacts 12, wires $m$ $f$, plug 60, spring contact 66, and wire 78 to and through the coil of the "stop" magnet 77 and thence by wire 79, spring contact $67^a$, plug $61^a$ and wire $g'$ to ground; and the "stop" magnet 77, being thus energized, rocks the lever 74 to thereby open clutch 71, disconnecting shaft 68 from shaft 52, and to open the normally closed contacts of contact fingers 81 82 and 83 84 and to close the normally open contacts of contact-fingers 85 86. A further circuit is thus established from feed-wire $z$ by wires $t$ and $g$, plug 61, spring-contact 67, wires 192 and 191, spring-contact fingers 86 and 85, wires 190 and 189, spring-contact 63, plug 57 and wire $c$ to and through the coil of the stylus magnet 21 and thence by wire $c'$ to ground, thereby energizing this magnet and causing it to swing the free end of stylus $C'$ to the right side of a column of the record sheet to record the shop machine with which it is associated as not producing. At the same time the "stop" signal lamps 19 and 20 are lighted—the former by current from wire $s$ by wires $m'$ and $p$ through the lamp and thence by wires $q\ ?$ and $j$ to the negative line wire $y'$, and the latter from wire $m$ by wire $v$ through the lamp and thence to wire $w$ and by that wire to the negative feed wire $z'$—and the relay magnet 14 is energized, by current from wire $m'$ by wire $o$ through its coil and thence by wire $j$ back to the negative side of the system, and thereupon acts to close the normally open contacts 13 and so establishes a circuit from the main line wire $x$ by wires $aa$, contacts 13, and wires $ee$ and $ff$ through the lamp 15 and thence back to the main line wire $x'$.

One of the shop machines is now started, which is done by pulling down the handle 6 (and at the same time pulling down handle 11 to open contacts 10 and break the circuit through the coil of solenoid 7 if energized) and thereby shifting the operating belt of the shop machine from loose pulley 3 to the fixed pulley 4. The core of solenoid 7 thereupon drops and releases contacts 12, which spring open and so open the circuits of the "stop" signal lamps 19 20, of relay magnet 14 and thereby of "stop" signal lamp 15, and of the actuating coil of "stop" magnet 77. This magnet, being now de-energized, releases its armature and immediately thereupon the contacts of contact-fingers 85 86 open and break the circuit through the coil of stylus magnet 21, thereby releasing the stylus which swings to normal position with its point at the center of the column of the record sheet with which it is associated, the contacts of contact-fingers 83 84 and 81 82 close, and, the clutch spring closing clutch 71, the time register counters 93 thereupon start to accumulate and register the elapsed or gross running time of the shop machine and the Geneva gears start their counter-clockwise rotation.

Assuming, first, that the shop machine when started begins at once to operate productively at the standard rate here predetermined, that is to say, to produce and deliver a finished razor blade at the end of every twenty seconds of time allowed therefor, the operation of the apparatus is as follows: At the end of eighteen seconds, as here adjusted, the tooth of the back Geneva gear 117 reaches the notch in quadrant 117ª and rocks this quadrant which, by the means and in the manner already described, opens and holds open the normally closed contacts of contact-fingers 218 219 and at the same time rocks the actuating arm 222 of the counters 223, to draw back the pawl as usual one tooth on the ratchet wheel of the counters and to put spring 235 in tension, and swings the armature 238 up against the pole-piece 204 of "speed-cycle release" magnet 167. At the end of twenty seconds the tooth of the main Geneva gear 115, having reached the notch in quadrant 115ª, has rocked this quadrant in the manner hereinabove described to an extent sufficient to press contact-finger 184 from its contact with contact-finger 183 but not to the extent required to close its contact with contact-finger 185. Thereupon, the shop machine delivers a razor blade and in the delivery thereof momentarily effects the closure of the normally open contacts of switch 16. The various switch contacts and the circuits controlled thereby are now in the condition shown in connection with shop machine A¹, stylus C¹ and registering and control unit D¹ at the left hand end of Fig. 1 of the drawings, where, all other circuits being open, a circuit is established from the line wire y by wire a, contacts of switch 16, wire b, plug 56, spring-contact 62, and wires 169 and 168 to and through the coil of "speed-cycle release" magnet 167 and thence by wires 79ª and 79, spring-contact 67ª, plug 61ª and wire g' to ground; and the magnet, being thus energized, attracts its armature and, by the means and in the manner already described, releases from their operative engagement with clutch disk 111 the three Geneva gears which by the action of main spring 138 are instantly returned clockwise to their predetermined starting point and in so doing allow contact-finger 184 to spring back into contact with contact-finger 183 and also mechanically release contact-finger 219 and the actuating arm 222 of the numbering counters 223 which parts, however, as already explained, are held locked against movement by the action of magnet 167 in holding to its pole-piece the armature 238. Then, after a very brief interval, the delivery of the finished razor blade is completed and the contacts of switch 16 open, thereby opening the circuit through the coil of magnet 167 which at once releases both the armature 238, thereby permitting contact-finger 219 to spring back into contact with contact-finger 218 and the spring 235 to rock the actuating arm of the counters to thereby move the numbering counters one unit to count this productive operation of the shop machine, and also releases its own armature to thereby permit the Geneva gears to be again brought into operative engagement with clutch disk 111 and begin once more their travel counter-clockwise. The delayed closure of contact-fingers 218 and 219 is important, as already pointed out, since if they were to close before the contacts of switch 16 open, they would establish a circuit from wire 169, by wire 221 over these contacts and by wire 220, contact-finger 65, plug 59, wires e, h and i through the coil of relay magnet 9 and thence by wire j to line wire x' and this relay would, as will presently be seen, close the circuit through the core of solenoid 7 and so shut down the shop machine. This cycle of operations is repeated so long as the shop machine continues to operate productively at the predetermined standard rate, the stylus remaining throughout with its point at the center of the appropriate column on the record sheet and recording thereon a continuous perpendicular line, as at R, Fig. 12.

Suppose, however, that the shop machine now starts to produce at a rate faster than the predetermined standard rate, but not above the rate permitted,—for example, delivers a finished razor blade at the end of every nineteen seconds of time. The operations are as before described, with the exception that, at the time the shop machine delivers a blade and thereby effects a closure of the contacts of switch 16, the main Geneva gear 115 has not had time to reach the position at which contact-finger 184 is pressed out of contact with contact-finger 183. The result is that, when the above-described circuit through the coil of the "speed-cycle release" magnet 167 is established by the closing of the contacts of switch 16, a further circuit is established from wire 168 by wire 170, contact-fingers 81 and 82, wire 188, contact-fingers 184 and 183, wire 186, contact-fingers 83 and 84, wire 187, spring-contact 64, plug 58, and wire *d* to and through the coil of stylus magnet 22 and thence by wire *d'* to ground, thus energizing magnet 22 and causing the point of the stylus to swing to the left side of the column on the record sheet with which it is associated. But the stylus is held in this position only momentarily, since the circuit through its magnet will be broken at the same time that the contacts of switch 16 open to break the circuit through the coil of the "speed-cycle release" magnet 167. So long, therefore, as the shop machine continues to produce at the "fast" rate here assumed, its operations will be registered by the numbering counters and the stylus will produce a close series of horizontal lines, to the left of the position of the vertical line R recording performance at the standard rate, as at F, Fig. 12.

Suppose, again, that the shop machine is producing at slower than the standard rate of production, but not below the limit permitted,—for instance delivers a finished razor blade at the end of every twenty-two seconds of time. In this case, before the blade is delivered and the contacts of switch 16 are closed, to energize the "speed-cycle release" magnet 167 and release the Geneva gears from their operative engagement with clutch disk 111, the back Geneva gear 117 has operated, as above described, and the main Geneva gear 115 has traveled to such extent that contact-finger 184 has not only been sprung out of contact with contact-finger 183 but to closed contact with contact-finger 185. Hence, on the closure of switch 16 there is established, in addition to the above-described circuit through the coil of magnet 167, a circuit from wire 168 by wire 170, contact-fingers 81 and 82, wire 188, contact-fingers 184 and 185, wire 189, spring-contact 63, plug 57, and wire *c* to and through the coil of stylus magnet 21 and thence by wire *c'* to ground, thus energizing magnet 21 and thereby swinging the point of the stylus to the right side of the column on the record sheet with which the stylus is associated. This additional circuit, as in the case of the additional circuit established when the shop machine is producing at higher than the standard rate, is closed only so long as the contacts of switch 16 remain closed, and hence while the shop machine is running at the "slow" speed assumed the record made by the stylus on the record sheet will be a close series of horizontal lines, now to the right of line R of standard performance, as at S, Fig. 12.

In the event that a shop machine takes for a productive operation more than the four seconds allowed by the setting of a machine above the predetermined standard twenty seconds therefor, the back Geneva gear 117 and main Geneva gear 115 will not only have operated as last above described to open contact between contact fingers 218 and 219 and to open contact between contact fingers 183 and 184 and close contact between contact fingers 184 and 185, but the front Geneva gear 116 will also have reached and rocked its quadrant 116ª and so effected a closure of the contacts of contact finger 205 with contact fingers 206 and 207 while the contacts of switch 16 still remain open. Consequently, "speed-cycle release" magnet 167 has not been energized but circuits have been established which produce the condition of switch contacts and of circuits controlled thereby which is shown in connection with shop machine A², stylus C², and registering and control unit D² in the central portion of Fig. 1 of the drawings. Here, one circuit from feed-wire *z* by wires *t* and *g*, plug 61, spring contact 67, wires 192 and 208, contact fingers 205 and 207, wire 210, spring contact 65, plug 59, and wires *e h* and *i* through the coil of relay magnet 9 and thence by wire *j* to line wire *y'* has energized relay magnet 9 and thereby has effected the closure of the normally open contacts 8. The closure of these contacts has closed a circuit from main line wire *x* by wires *aa* and *bb*, contacts 8, and wire *cc* through the coil of solenoid 7 and thence by contacts 10 and wire *dd* back to main line wire *x'*, and the solenoid 7, thus energized, has raised its core and thereby shifted the operating belt from loose pulley 4 back to loose pulley 3 and so has automatically shut down the shop machine. The raising of the core of solenoid 7 has operated, further, to close contacts 12 and thereby has established a circuit from line wire *y* by wires *a* and *r*, contacts 12, wires *s m* and *f*, plug 60, spring-contact 66 and wire 78 through the coil of "stop" magnet 77 and thence by wire 79, spring contact 67ª, plug 61ª and wire *g'* to ground; and this magnet, by the means and in the manner already described, thereupon opened the clutch 71 and so arrested the movement of the time registering counters 93 and the rotation of clutch disk 111 and the Geneva gears now operatively connected therewith, preventing any actuation of the numbering counters 223, and at the same time has forced contact fingers 82 and 84 out of contact with contact fingers 81 and 83 and contact finger 85 into contact with contact finger 86. Not only has all movement of the mechanism of the registering and control unit been thus arrested, but meanwhile, and before contact fingers 82 84 and 85 could be shifted on the energization of "stop" magnet 77, a circuit was first momentarily established from wire 168 by wire 170, contact fingers 81 and 82, wire 188, contact fingers 184 and 183, wire 186, contact fingers 83 and 84, wire 187, spring contact 64, plug 58, and wire *d* through the coil of stylus magnet 22 and thence by wire *d'* to ground, thereby swinging the stylus to the left of its associated column on the record sheet, and then the shifting of contact fingers 82, 84 and 85 which quickly followed opened this circuit and established a circuit from wire 192 by wire 191, contact fingers 86 and 85, wires 190 and 189 spring contact 63, plug 57, and wire $c$ through the coil of stylus magnet 21 and thence by wire $c'$ to ground, whereby this magnet was energized and has swung the stylus from the left across to the right side of the column on the record sheet where the stylus will now remain, recording first a horizontal line across the column and then, until it is released, a straight perpendicular line at the right of the column as at F S and S¹, Fig. 12. A further circuit from wire $h$ by wire $k$ through signal lamp 17 and thence by wires $l$ and $j$ to line wire $x'$ lights this "non-production" signal lamp, which is conveniently located adjacent the shop machine, and a second circuit from wire $h$ by wire $u$ through lamp 18 and thence by wire $w$ to the negative feed-wire $z'$ lights this similar "non-production" signal lamp, located near the control apparatus. A third circuit from wire $m$ by wires $m'$ and $p$ through lamp 19 and thence by wire $q$ to wire $l$ and back by wire $j$ to line wire $y'$, lights a second or "stop" signal at the shop machine, while a fourth circuit from wire $m$ by wire $v$ through lamp 20 and thence by wire $w$ to feed-wire $z'$ lights a similar "stop" signal near the control apparatus. And, finally, a circuit from wire $m$ by wires $m'$ and $o$ and the coil of relay magnet 14 to wire $j$ and thence to line wire $x'$ has energized this relay and so closed a circuit from main line wire $x$ by wire $aa$, contacts 13, and wires $ee$ and $ff$ through lamp 15 and thence back to main line wire $x'$, thereby lighting this common "stop" signal, which may be conveniently located, say, at one end of the corridor along which the various shop machines are positioned. Everything now remains as described until the shop machine is again started, whereupon the opening of contacts 12 breaks the circuit through the coil of "stop" magnet 77, thereby allowing the clutch spring to reclose clutch 71 and restoring contact fingers 81 82, 83 84 and 85 86 to their original normal condition; and with the closure and opening of the contacts of switch 16 on the first productive operation of the shop machine the Geneva gears are released from their engagement with clutch disk 111, returned to their starting point, and there again operatively connected with the clutch disk, and the numbering counters are advanced one unit.

Or, on the contrary, should a shop machine take less than the two seconds allowed by the setting of the apparatus below the predetermined standard time of twenty seconds—say, only seventeen seconds for a productive operation,—the contacts of switch 16 will be closed before the back Geneva gear 117 has reached a position to operatively engage its quadrant and thereby force contact finger 219 from contact with contact finger 218, with the result that a circuit is established from line wire $y$ by wire $a$, contacts of switch 16, wire $b$, plug 56, spring contacts 62, to wire 169 and thence both by wire 168, coil of "speed cycle release" magnet 167, wires 79ª and 79, spring contact 67ª, plug 61ª and wire $g'$ to ground, and also by wire 221, contact fingers 219 and 218, wire 220, spring contact 65, plug 59, wires $e$ $h$ and $i$, coil of relay magnet 9, and wire $j$ back to line wire $y'$. The "speed cycle release" magnet thereupon effects the release from clutch disk 111 of the Geneva gears, which are returned to their starting point, while the relay magnet closes contacts 8 and thereby establishes a circuit from main line wire $x$ by wires $aa$ and $bb$, coil of solenoid 7, contacts 10 and wire $dd$ back to main line wire $x'$. Solenoid 7, thus energized, in turn raises its core and by so doing both shifts the operating belt from fixed pulley 4 to loose pulley 3, thereby shutting down the shop machine, and at the same time closes contacts 12 and establishes a circuit from wire $a$ by wire $r$, contacts 12, wire $s$ $m$ and $f$, plug 60, spring contact 66 and wire 78 through the coil of the "stop" magnet 77 and thence by wire 79, spring contact 67ª, plug 61ª and wire $g'$ to ground. The action of this magnet, as before, is to open clutch 71, thus arresting the movement of the mechanism of the registering and control unit, and to shift contact fingers 82 84 and 85; and, further, as in the case where the shop machine was automatically shut down by a too slow speed of its productive operation, the circuit described was momentarily established through the coil of stylus magnet 22, thus swinging the stylus to the left of its column on the register sheet, and then this circuit was broken and the further circuit described was established through stylus magnet 21, which swings the stylus from the left clear across to the right of the column on the record sheet, to record thereon first another horizontal line across the column and from the end thereof a perpendicular line down the right side of the column, as at F S' and S', Fig. 12. Here, also, the additional circuits which light the "non-production" signal lamps 17 and 18, the "stop" signal lamps 19 and 20, and the single "stop" signal lamp 15 are established; and here, also as in the case where the shop machine has been automatically shut down by its operation at a speed below that allowed, the mechanism of the control apparatus, thus arrested, is restored to normal operation when the shop machine is again started and a productive operation thereof first closes and then opens the contacts of switch 16. In this case, however, the counting of the operation of the shop machine, which because of its rapidity has probably resulted in a defective product, will be omitted since the actuating arm of the numbering counters has not been rocked back to operative position and hence the counters will not be actuated when the contacts of switch 16 are first thereafter closed and opened.

It is to be observed, in this connection, that as the apparatus is here set the actuating arm of the numbering counters can be rocked back to operative position only at intervals of twenty seconds, and, further, that it takes the back Geneva gear 117 nearly all of the two seconds by which it acts ahead of the main Geneva gear 115 to effect such movement of the actuating arm. The advantage of this is that any unauthorized actuation of these counters by a manipulation of the switch 16 is rendered practically impossible, since they can be actuated by a closure of the contacts of switch 16 only at definite timed intervals and with a leeway of a very few seconds—a thing which it is impossible to do without the aid of an accurate watch.

Should it happen for any reason that the counter-clockwise movement of the Geneva gears is not arrested until the outer end of the spring-mounted arm 126 reaches and is acted upon by the safety pin 181, to press back the arm and disconnect it from the teeth of clutch disk 111, the conditions will be the same as where the "stop" magnet 77 has been energized by a too slow operation of the shop machine and has accordingly automatically shut it down.

If it should at any time be found desirable to use the apparatus to record upon the record sheet the non-productive operation of a shop machine, that is to say, the time the shop machine is running but is not actually producing, instead of to automatically shut down the shop machine, this can be done by opening a switch 250 provided in the wire $i$ as shown in connection with the shop machine at the right hand end of Fig. 1. When this switch is open, the failure of the shop machine to deliver a finished product within the twenty-four second allowed therefor, as the apparatus is here adjusted, will produce the condition of switches and of circuits controlled thereby which is illustrated in connection with shop machine $A^3$, stylus $C^3$ and registering and control unit $D^3$ at the right hand end of Fig. 1 of the drawings. As here shown, the contacts of switch 16 have not been closed but the back Geneva gear 117 has moved contact finger 219 out of contact with contact finger 218, the main Geneva gear 115 has moved contact finger 184 out of contact with contact finger 183 and into contact with contact finger 185, and the front Geneva gear 116 has moved contact finger 205 into contact both with contact finger 206 and with contact finger 207. There has thus been established a circuit from feed-wire $z$ by wires $t$ and $g$, plug 61, spring contact 67, wires 192 and 208, contact fingers 205 and 206, wires 209 and 186, contact fingers 83 and 84, wire 187, spring contact 64, plug 58, wire $d$, coil of stylus magnet 22 and wire $d'$ to ground. The stylus magnet 22, thus energized, swings the stylus to the left of its associated column on the record sheet where it will remain and record thereon a perpendicular line down this side of the column, as at N P, Fig. 12, so long as the shop machine remains non-productive. At the same time further circuits are established from feed-wire $z$ to spring contact finger 205 as before and thence by contact finger 207, wire 210, spring contact 65, plug 59, to wire $e$ and thence both by wires $h$ and $k$, lamp 17, and wires $l$ and $j$ to negative line wire $y'$, and by wire $u$, lamp 18 and wire $w$ to negative feed-wire $z'$, thus lighting both of these two "non-production" signals. Whenever the shop machine again starts producing, the closure of the contacts of switch 16 will energize the "speed cycle release" magnet 167, which will release the Geneva gears from their engagement with clutch disk 111, whereupon these gears will be returned to their starting point by the main spring and in so doing will restore the various contacts and control circuits to their normal condition.

Again, it is to be observed that, with the connections as shown and hereinabove described, the actuating circuit of the "stop" magnet 77 is controlled by switch contacts 12. Hence, since these contacts are closed and the magnet is energized to thereby open clutch 71, only when the associated shop machine is shut down, the time register counters 93 are actuated so long as the shop machine is running, whether productively or idly, and, as already pointed out, will accumulate the gross running time of such machine. But, if desired, the circuit of the "stop" magnet can be placed under the additional or primary control of the front Geneva gear 116, so that it will accumulate and register, within the limits fixed by the adjustment of said gear, only the time of the productive operation of the shop machine by simply providing a jumper connection between spring contacts 65 and 66 as by a wire indicated by the dotted line 251, Fig. 1. Such a connection, whenever the shop machine takes for a productive operation more than the time required for Geneva gear 116 to effect the closure of contact fingers 205 and 207, or twenty-four seconds according to the adjustments shown, a circuit will be established from feed-wire $z$ by wires $t$ and $g$, plug 61, spring contact 67, wires 192 and 208, contact fingers 205 207, and wires 210, 251 and 78 to the coil of magnet 77 and thence by wire 79, spring contact $67^a$, plug $61^a$ and wire $g'$ to ground, and clutch 71 will be opened and will interrupt the actuation of the time register counters. Furthermore, when, as by opening switch 250, the automatic shutdown is not being employed or in case this feature should be omitted entirely, the apparatus can be made to register the time of the efficient productive operation of the shop machine, as distinguished from its total time of productive operation, by so setting Geneva gear 116 upon the main Geneva gear 115 that it will become effective at the same time that the main Geneva gear becomes effective, such adjustment being indicated by setting the disks 165 to register 00.

The apparatus is thus capable of registering and accumulating the gross running time, the time of productive operation, or the time of efficient productive operation of the shop machine, whichever may be desired, and, by deducting such time from the total elapsed time, of showing the time the shop machine is not running or is not operating productively or is not operating efficiently.

It is, of course, to be understood that the specific apparatus herein shown and hereinabove described may be variously modified in its many details and that the features therein combined may be combined differently or certain of them omitted without departing from the spirit or sacrificing the substantial advantages of the invention as defined in the appended claims.

What I claim as new, and desire to secure by Letters Patent, is—

1. In apparatus of the character described, the combination of a control device including an electric circuit adapted to be controlled by a shop machine and means including other electric circuits controlled in turn by said control device and operative under such control to effect the shutting down of the shop machine whenever its rate of production varies more than a fixed limit from a predetermined standard rate.

2. In apparatus of the character described, the combination of means for operating a shop machine, means for indicating the operation of the shop machine, control apparatus, means adapted to be controlled by the operation of the shop machine for controlling the control apparatus, and means in turn controlled by the control apparatus for jointly controlling said indicating means and said machine operating means and operative under such control to effect the shutdown of the machine whenever its rate of production varies more than a fixed limit from a predetermined standard rate.

3. In apparatus of the character described, a control device comprising driving means and a driven member, means including an electric circuit adapted to be controlled by a shop machine and operative thereunder to control the operative connection between said driving means and driven member, and means controlled in turn by said driven member and including electromagnetically controlled electric circuits adapted to shut down the shop machine whenever the rate of production of the shop machine varies from a predetermined standard rate more than a fixed limit.

4. In apparatus of the character described, the combination of a movable member, means for driving said member at substantially constant speed, means including an electric circuit and switch adapted for control by a shop machine and operative thereunder to disconnect said member from its driving means and to return it to a predetermined fixed starting point and there restore its connection with its driving means, and means controlled by said member and adapted to automatically shut down the shop machine when the rate of production of the shop machine exceeds by more than a fixed limit a predetermined standard rate.

5. In apparatus of the character described, the combination of a movable member, means for driving said member at substantially constant speed, means including an electric circuit and switch adapted for control by a shop machine and operative thereunder to disconnect said member from its driving means and to return it to a predetermined fixed starting point and there restore its connection with its driving means, and means including electromagnetically controlled circuits controlled by said member and operative thereunder to automatically shut down the shop machine when the rate of production of the shop machine falls by more than a fixed limit below a predetermined standard rate.

6. In apparatus of the character described, the combination of means for operating a shop machine, means for indicating the operation of the machine, a movably mounted member, means for driving said member at substantially constant speed, means including an electric circuit adapted to be controlled by the operation of the machine operative under such control to disconnect said member from its driving means and to return it to a predetermined starting point and there restore its connection with its driving means, and means including other electric circuits in turn controlled by said member for controlling said machine operating means and said indicating means and operative under such control to effect a shutting down of the machine both when the rate of its productive operation exceeds and when it falls below a predetermined rate by more than a fixed limit.

7. In apparatus of the character described, a control device comprising driving means and a driven member, means including an electric circuit adapted to be controlled by a shop machine and operative thereunder to control the operative connection between said driving means and driven member, a disengageable connection between said driving means and the source of driving power, and means selectively operative to automatically break said disengageable connection either whenever the shop machine is shut down or whenever the shop machine is not operating productively or whenever the shop machine fails to operate productively at a predetermined rate.

8. In apparatus of the character described, a control device comprising driving means and a driven member, means including an electric circuit adapted to be controlled by a shop machine and operative thereunder to control the operative connection between said driving means and driven member, a disengageable connection between said driving means and the source of driving power, and means including additional electric circuits selectively operative to automatically break said disengageable connection either when the shop machine is shut down or is not operating productively.

9. In apparatus of the character described, a control device comprising driving means and a driven member, means including an electric circuit adapted to be controlled by a shop machine and operative thereunder to control the operative connection between said driving means and driven member, a disengageable connection between said driving means and the source of driving power, and means including additional electric circuits adaptable as desired to automatically break said disengageable connection either when the shop machine is not running productively or when it fails to operate productively at a predetermined rate.

10. In apparatus of the character described, a control device comprising an electric switch, a reciprocating member adapted to alternately actuate and release the movable element of the switch, an electromagnet, means controlled by the electromagnet for controlling the movement of the reciprocating member, and means for holding the movable switch element when released by the reciprocating member so long as the electromagnet remains energized.

11. In apparatus of the character described, a control device comprising a rotary member adapted to be driven at substantially constant speed, a Geneva gear mounted in axial alignment with said member and normally operatively connected to rotate therewith, an electromagnet, means controlled by the electromagnet for breaking the operative connection of the Geneva gear with said member and returning it to a predetermined starting point and there restoring its operative connection with said member, an electric switch, means actuated by the Geneva gear for alternately actuating and releasing the switch, and means for delaying the release of the switch so long as the electromagnet is energized.

12. In apparatus of the character described, a control device comprising a rotary member adapted to be driven at substantially constant speed, a plurality of Geneva gears mounted to rotate together in axial alignment with said member, electromagnetically controlled means for operatively connecting the Geneva gears with said member and for breaking such connection and returning the Geneva gears to a predetermined starting point and there restoring their operative connection with said member, a plurality of switch contacts adapted to control a plurality of electrical circuits, and means actuated by the Geneva gears for actuating said contacts successively in predetermined order and at predetermined time intervals.

13. In apparatus of the character described, a machine registering and control unit comprising a casing adapted to be set up with other similar units adjacent a drive shaft and, mounted within said casing, a shaft, coupling means adapted normally to operatively connect said shaft with the drive shaft when the casing is in position, a registering device driven by said shaft, and a control mechanism, including a part driven by said shaft and electromagnetically controlled circuit connections, adapted to be controlled by the operation of a shop machine and operative under such control to disconnect said shaft from the drive shaft and to effect a shutdown of the shop machine whenever the rate of production thereof varies beyond a fixed limit from a predetermined rate.

14. In apparatus of the character described, a registering and control unit comprising a casing adapted to be set up adjacent a drive shaft and, mounted within said casing, numbering discs, means for actuating said discs, a shaft normally operatively connected with the drive shaft when the casing is in position, and control mechanism comprising a member driven from said shaft, a control element controlling said disc actuating means, and means adapted to be controlled by a shop machine controlling an operative connection between said member and said control element.

15. In apparatus of the character described, a registering and control unit comprising a casing adapted to be set up adjacent a drive-shaft and, mounted within said casing, numbering discs, means for actuating said discs, a shaft normally operatively connected with the drive-shaft when the casing is in position, and control mechanism comprising a rotary member driven from said shaft, a control element rotatively mounted coaxially with said member, electromagnetically controlled means for operatively connecting said control element with said member to rotate therewith and for breaking such operative connection and returning said element to a fixed starting point and there restoring its operative connection with said member, and means associated with said control element for controlling the disc actuating means and operative to effect the actuation of said discs only after said control element has travelled with said rotary member through a predetermined radial angle and has then been released therefrom and returned to its starting point to be there restored to connection with said rotary member.

16. In apparatus of the character described, a registering and control unit comprising a casing adapted to be set up adjacent a drive shaft and, mounted therein, a shaft, means operatively connecting said shaft with the drive-shaft when the casing is in position, a rotary member driven from said shaft, a control element rotatably mounted coaxially with said rotary member, electromagnetically controlled means for operatively connecting said control element with said rotary member to travel therewith and for breaking such connection and returning the control element to a predetermined starting point and there restoring it to operative connection with the rotary member, a plurality of switches adapted to control the operating circuits of a plurality of electromagnets located outside the casing, and means actuated by said control element and operative at one point in its travel with said rotary member to actuate the switch contacts controlling the circuit of one of said magnets and at another point in its travel with said rotary member to actuate the switch contacts controlling the actuating circuit of another of said magnets.

17. In apparatus of the character described, the combination, with a movable registering element and actuating means therefor, of a member adapted to be driven from a predetermined starting point and at the end of a predetermined time interval to effect an operative engagement of said actuating means with said element, and electromagnetically controlled means for thereafter controlling the said element.

18. In apparatus of the character described, the combination, with a movable registering element, of an actuating arm therefor, and means including an electric circuit adapted for control by a shop machine and operative thereunder to effectively actuate said arm but only at or after predetermined time intervals.

19. In apparatus of the character described, the combination, with a movable registering element and actuating means therefor, of control means including an electric circuit adapted for control by a shop machine and operative thereunder to effect the actuation of said mechanical element only at or after predetermined time intervals.

20. In apparatus of the character described, the combination, with a movable element and actuating means therefor, of a control device comprising a movable member, means for driving said member at substantially constant speed from a fixed starting point, electromagnetically controlled means for disconnecting said member from its driving means and returning it to its starting point and there restoring its connection with its driving means, and means whereby the actuating means of said mechanical element will be rendered operative only after said member has been driven a predetermined distance from its starting point before being disconnected from its driving means.

21. In apparatus of the character described the combination, with a movable record sheet and a stylus operatively associated therewith and normally biased to a given position with respect to the direction of movement of the sheet, of two electromagnets adapted when energized to shift the point of the stylus laterally of the sheet one to one side and the other to the other side of its said normal position respectively, and control means including an electric circuit and switch adapted for control by a shop machine and operative thereunder to maintain the operative circuits of both of said stylus magnets open so long as the shop machine is productively operating at a predetermined rate and to close the operative circuit of one of said magnets whenever the rate of production of the shop machine respectively varies from such predetermined standard rate.

22. In apparatus of the character described, the combination, with electromagnetically controlled means for operating a shop machine and a movable record sheet and a stylus operatively associated therewith and normally biased to a given position with respect to the direction of movement of the sheet, of two electromagnets adapted when energized to shift the point of the stylus laterally of the sheet one to one side and the other to the other side of its said normal position respectively, and control means including an electric circuit adapted for control by the shop machine and operative thereunder to maintain the operative circuits of both of said stylus magnets open so long as the shop machine is productively operating at a predetermined standard rate, to momentarily close the operative circuit of one of said magnets whenever the rate of production of the shop machine varies from such predetermined standard rate but within predetermined limits, and whenever the rate of production of the shop machine varies from such predetermined standard rate by more than the predetermined limits to momentarily close the operative circuit of one of said magnets and then to close the operative circuit of the other of said magnets and through said electromagnetically controlled operating means to effect a shut down of the shop machine.

23. In apparatus of the character described, the combination, with a movable record sheet and a stylus operatively associated therewith and normally biased to a given position with respect to the direction of movement of the sheet, two electromagnets adapted when energized to shift the point of the stylus laterally of the sheet one to one side and the other to the other side of its normal position respectively, and control means including an electric circuit adapted for control by a shop machine and operative thereunder to maintain the operative circuits of both of said stylus magnets open so long as the shop machine is productively operating at a predetermined standard rate, to momentarily close the operative circuit of one of said magnets whenever the rate of production of the shop machine varies from such predetermined standard rate, and to close and maintain closed the operative circuit of one of said magnets when and so long as the shop machine is not operating productively.

24. Apparatus of the character described comprising a casing, a member mounted to rotate therein, a stop element carried by said member eccentric to its axis of rotation, means adapted for actuation from without the casing for rotating said member to shift the angular position of the stop element whereby said member will be held in position as so adjusted, and a device readable at the face of the casing automatically actuated by the rotation of said member to register the angular position of the stop.

25. A registering device comprising two disks mounted upon a shaft to rotate thereon and an intermediate washer secured against rotation, and, as means for actuating the second from the first of said disks a series of shallow conical cavities formed in the inner side of the second disk adjacent the washer arranged in a circle concentric with the axis of rotation of said disk and spaced at equal distances apart, an arcuate slot with curved ends formed in the washer in register with the cavities in the said disk and of a length between the centers of its curved ends equal to the distance between centers of two adjoining cavities, and a pin mounted in the first disk to reciprocate axially thereof in register with the arcuate slot in the washer and having a tapering cone-shaped inner end adapted to yieldingly bear against the washer and when the said slot is reached to partially extend therethrough and into a cavity in the second disk and to be forced back out of said cavity and slot by the cam action of the inclined surface at its inner end on the washer when the end of the slot is reached.

EDWARD A. HODGE.